United States Patent
Renner et al.

(10) Patent No.: US 11,881,012 B2
(45) Date of Patent: Jan. 23, 2024

(54) TRANSITION DETECTOR NEURAL NETWORK

(71) Applicant: Gracenote, Inc., Emeryville, CA (US)

(72) Inventors: Joseph Renner, Lille (FR); Aneesh Vartakavi, Emeryville, CA (US); Robert Coover, Orinda, CA (US)

(73) Assignee: Gracenote, Inc., New York, NY (US)

( * ) Notice: Subject to any disclaimer, the term of this patent is extended or adjusted under 35 U.S.C. 154(b) by 311 days.

(21) Appl. No.: 17/226,841

(22) Filed: Apr. 9, 2021

(65) Prior Publication Data

US 2021/0321150 A1 Oct. 14, 2021

Related U.S. Application Data

(60) Provisional application No. 63/008,477, filed on Apr. 10, 2020.

(51) Int. Cl.
*G06V 10/82* (2022.01)
*H04N 21/81* (2011.01)
(Continued)

(52) U.S. Cl.
CPC .............. *G06V 10/82* (2022.01); *G06F 18/24* (2023.01); *G06F 18/2413* (2023.01);
(Continued)

(58) Field of Classification Search
CPC ........... H04N 21/812; H04N 21/23424; H04N 5/147; H04N 19/142; G06N 3/049;
(Continued)

(56) References Cited

U.S. PATENT DOCUMENTS

2003/0202773 A1 10/2003 Dow et al.
2004/0010480 A1* 1/2004 Agnihotri .............. G06N 3/086
706/31
(Continued)

FOREIGN PATENT DOCUMENTS

KR 10-2014-0057407 A 5/2014

OTHER PUBLICATIONS

Li, et al. (CNN-based Commercial Detection in TV Broadcasting), pp. 1-6. (Year: 2017).*

(Continued)

*Primary Examiner* — Daniel G Mariam
(74) *Attorney, Agent, or Firm* — McDonnell Boehnen Hulbert & Berghoff LLP

(57) ABSTRACT

In one aspect, an example method includes (i) extracting a sequence of audio features from a portion of a sequence of media content; (ii) extracting a sequence of video features from the portion of the sequence of media content; (iii) providing the sequence of audio features and the sequence of video features as an input to a transition detector neural network that is configured to classify whether or not a given input includes a transition between different content segments; (iv) obtaining from the transition detector neural network classification data corresponding to the input; (v) determining that the classification data is indicative of a transition between different content segments; and (vi) based on determining that the classification data is indicative of a transition between different content segments, outputting (Continued)

transition data indicating that the portion of the sequence of media content includes a transition between different content segments.

17 Claims, 4 Drawing Sheets

(51) Int. Cl.
*G06N 3/049* (2023.01)
*G06N 3/08* (2023.01)
*H04N 21/234* (2011.01)
*G06V 20/40* (2022.01)
*G06F 18/24* (2023.01)
*G06F 18/2413* (2023.01)
*G06V 10/80* (2022.01)

(52) U.S. Cl.
CPC ............... *G06N 3/049* (2013.01); *G06N 3/08* (2013.01); *G06V 10/806* (2022.01); *G06V 20/41* (2022.01); *G06V 20/46* (2022.01); *H04N 21/23424* (2013.01); *H04N 21/812* (2013.01)

(58) Field of Classification Search
CPC ........ G06N 3/08; G06V 10/82; G06V 10/806; G06V 20/46; G06F 18/24; G06F 18/2413
See application file for complete search history.

(56) References Cited

U.S. PATENT DOCUMENTS

| | | | |
|---|---|---|---|
| 2004/0062520 A1* | 4/2004 | Gutta ................. | H04N 21/4394 386/249 |
| 2004/0161154 A1 | 8/2004 | Hua et al. | |
| 2011/0157475 A1 | 6/2011 | Wright et al. | |
| 2014/0282795 A1* | 9/2014 | Kummer ............ | H04N 21/4331 725/116 |
| 2016/0342844 A1 | 11/2016 | Kansara | |
| 2017/0264969 A1* | 9/2017 | Mitra ..................... | H04H 60/58 |
| 2019/0318754 A1* | 10/2019 | Le Roux ................. | G10L 19/02 |

OTHER PUBLICATIONS

Witkowski, et al. (Improving Advertisement Delivery in Video Streaming), pp. 1-37. (Year: 2017).*
India, Miguel et al., "LSTM Neural Network-based Speaker Segmentation using Acoustic and Language Modeling," INTERSPEECH 2017, Aug. 2017.
India et al., LSTM Neural Network-based Speaker Segmentation using Acoustic and Language Modelling, TALP Research Center, Universitat Politecnica de Catalunya, Spain, INTERSPEECH 2017, Aug. 20-24, 2017, Stockholm, Sweden, pp. 2834-2838, http://dx.doi.org/10.21437/Interspeech.2017-407.
International Search Report for International Patent Application No. PCT/US2021/026651, dated Jul. 28, 2021, 3 pages.
Written Opinion for International Patent Application No. PCT/US2021/026651, dated Jul. 28, 2021, 5 pages.

* cited by examiner

400
TRANSITION DETECTOR NEURAL NETWORK

CROSS-REFERENCE TO RELATED APPLICATIONS

This disclosure claims priority to U.S. Provisional Patent App. No. 63/008,477, filed on Apr. 10, 2020, which is hereby incorporated by reference in its entirety.

USAGE AND TERMINOLOGY

In this disclosure, unless otherwise specified and/or unless the particular context clearly dictates otherwise, the terms "a" or "an" mean at least one, and the term "the" means the at least one.

In this disclosure, the term "connection mechanism" means a mechanism that facilitates communication between two or more components, devices, systems, or other entities. A connection mechanism can be a relatively simple mechanism, such as a cable or system bus, or a relatively complex mechanism, such as a packet-based communication network (e.g., the Internet). In some instances, a connection mechanism can include a non-tangible medium (e.g., in the case where the connection is wireless).

In this disclosure, the term "computing system" means a system that includes at least one computing device. In some instances, a computing system can include one or more other computing systems.

BACKGROUND

In various scenarios, a content distribution system can transmit content to a content presentation device, which can receive and output the content for presentation to an end-user. Further, such a content distribution system can transmit content in various ways and in various forms. For instance, a content distribution system can transmit content in the form of an analog or digital broadcast stream representing the content.

In an example configuration, a content distribution system can transmit content on one or more discrete channels (sometimes referred to as stations or feeds). A given channel can include content arranged as a linear sequence of content segments, including, for example, program segments, advertisement segments (e.g., commercials), and promotion segments.

SUMMARY

In one aspect, an example method is disclosed. The method includes (i) extracting, by a computing system, a sequence of audio features from a portion of a sequence of media content; (ii) extracting, by the computing system, a sequence of video features from the portion of the sequence of media content; (iii) providing, by the computing system, the sequence of audio features and the sequence of video features as an input to a transition detector neural network, with the transition detector neural network being configured to classify whether or not a given input includes a transition between different content segments; (iv) obtaining, by the computing system, from the transition detector neural network classification data corresponding to the input; (v) determining, by the computing system, that the classification data is indicative of a transition between different content segments; and (vi) based on determining that the classification data is indicative of a transition between different content segments, outputting, by the computing system, transition data indicating that the portion of the sequence of media content includes a transition between different content segments.

In another aspect, an example non-transitory computer-readable medium is disclosed. The computer-readable medium has stored thereon program instructions that upon execution by a processor, cause performance of a set of acts including (i) extracting a sequence of audio features from a portion of a sequence of media content; (ii) extracting a sequence of video features from the portion of the sequence of media content; (iii) providing the sequence of audio features and the sequence of video features as an input to a transition detector neural network, with the transition detector neural network being configured to classify whether or not a given input includes a transition between different content segments; (iv) obtaining from the transition detector neural network classification data corresponding to the input; (v) determining that the classification data is indicative of a transition between different content segments; and (vi) based on determining that the classification data is indicative of a transition between different content segments, outputting transition data indicating that the portion of the sequence of media content includes a transition between different content segments.

In another aspect, an example computing system is disclosed. The computing system is configured for performing a set of acts including (i) extracting a sequence of audio features from a portion of a sequence of media content; (ii) extracting a sequence of video features from the portion of the sequence of media content; (iii) providing the sequence of audio features and the sequence of video features as an input to a transition detector neural network, with the transition detector neural network being configured to classify whether or not a given input includes a transition between different content segments; (iv) obtaining from the transition detector neural network classification data corresponding to the input; (v) determining that the classification data is indicative of a transition between different content segments; and (vi) based on determining that the classification data is indicative of a transition between different content segments, outputting transition data indicating that the portion of the sequence of media content includes a transition between different content segments.

DETAILED DESCRIPTION

I. Overview

Figure 1:
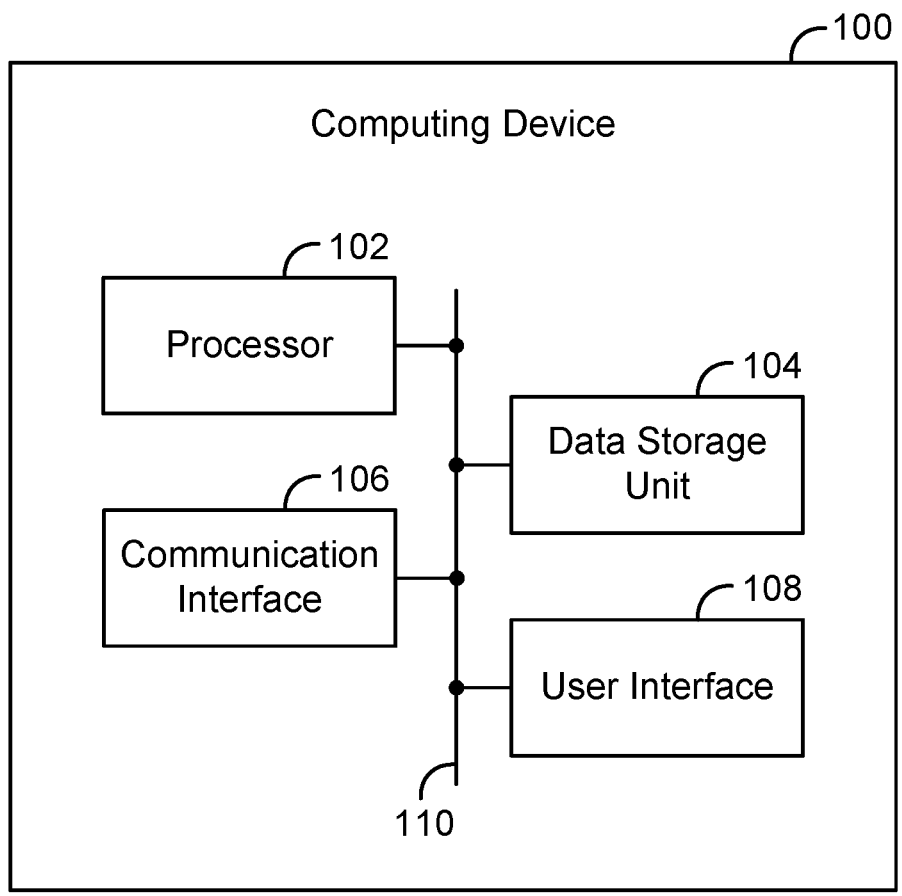
FIG. 1 is a simplified block diagram of an example computing device.

In the context of an advertisement system, it can be useful to know when and where advertisements are inserted. For instance, it may be useful to understand which channel(s) an advertisement airs on, the dates and times that the advertisement aired on that channel, etc. Further, it may also be beneficial to be able to obtain copies of advertisements that are included within a linear sequence of content segments.

For instance, a user of the system may wish to review the copies to confirm that an advertisement was presented as intended (e.g., to confirm that an advertisement was presented in its entirety to the last frame). In addition, for purposes of implementing an audio and/or video fingerprinting system, it may be desirable to have accurate copies of advertisements that can be used to generate reference fingerprints.

Still further, in some instances, when media content, such as a television show, is provided with advertisements that are inserted between program segments, it may be useful to obtain a copy of the television show from which the advertisements have been removed. This can allow a fingerprinting system to more granularly track and identify a location in time within the television show when a fingerprint of the television show is obtained from the television show during a scenario in which the television show is being presented without advertisements. The television show might not include advertisements, for instance, when the television show is presented via an on-demand streaming service at a later time than a time at which the television was initially broadcast or streamed.

Identifying transitions between different content segments of a linear sequence of content segments is a useful tool for a computing system assigned with the task of obtaining copies of advertisements that are included within a linear sequence of content segments and/or obtaining a copy of a television show from which the advertisements have been removed. For instance, after identifying transitions between advertisement segments and program segments, transitions between different advertisement segments, and transitions between different advertisement segments, a computing system can segment a linear sequence of content segments into program segments and advertisement segments, and generate a data file specifying the locations (e.g., start time and end times) of the program segments and/or advertisement segments within the linear sequence of content segments.

Disclosed herein are methods and systems for detecting transitions between different content segments in a sequence of media content, such as transitions between program segments and advertisement segments, transitions between different program segments, and/or transitions between different advertisement segments. In an example method, a computing system can extract a sequence of audio features and a sequence of video features from a portion of a sequence of media content. The computing system can then provide the sequence of audio features and the sequence of video features as an input to a transition detector neural network. The transition detector neural network can be configured to classify whether or not a given input includes a transition between different content segments. In addition, the computing system can obtain from the transition detector neural network classification data corresponding to the input, and determine that the classification data is indicative of a transition between different content segments. Based on determining that the classification data is indicative of a transition between different content segments, the computing system can then output transition data indication that the portion of the sequence of media content includes a transition between different content segments.

Various other features of the example method discussed above, as well as other methods and systems, are described hereinafter with reference to the accompanying figures.

II. Example Architecture

A. Computing Device

FIG. 1 is a simplified block diagram of an example computing device 100. Computing device 100 can perform various acts and/or functions, such as those described in this disclosure. Computing device 100 can include various components, such as processor 102, data storage unit 104, communication interface 106, and/or user interface 108. These components can be connected to each other (or to another device, system, or other entity) via connection mechanism 110.

Processor 102 can include a general-purpose processor (e.g., a microprocessor) and/or a special-purpose processor (e.g., a digital signal processor (DSP)).

Data storage unit 104 can include one or more volatile, non-volatile, removable, and/or non-removable storage components, such as magnetic, optical, or flash storage, and/or can be integrated in whole or in part with processor 102. Further, data storage unit 104 can take the form of a non-transitory computer-readable storage medium, having stored thereon program instructions (e.g., compiled or non-compiled program logic and/or machine code) that, when executed by processor 102, cause computing device 100 to perform one or more acts and/or functions, such as those described in this disclosure. As such, computing device 100 can be configured to perform one or more acts and/or functions, such as those described in this disclosure. Such program instructions can define and/or be part of a discrete software application. In some instances, computing device 100 can execute program instructions in response to receiving an input, such as from communication interface 106 and/or user interface 108. Data storage unit 104 can also store other types of data, such as those types described in this disclosure.

Communication interface 106 can allow computing device 100 to connect to and/or communicate with another entity according to one or more protocols. In one example, communication interface 106 can be a wired interface, such as an Ethernet interface or a high-definition serial-digital-interface (HD-SDI). In another example, communication interface 106 can be a wireless interface, such as a cellular or WI-FI interface. In this disclosure, a connection can be a direct connection or an indirect connection, the latter being a connection that passes through and/or traverses one or more entities, such as a router, switcher, or other network device. Likewise, in this disclosure, a transmission can be a direct transmission or an indirect transmission.

User interface 108 can facilitate interaction between computing device 100 and a user of computing device 100, if applicable. As such, user interface 108 can include input components such as a keyboard, a keypad, a mouse, a touch-sensitive panel, a microphone, and/or a camera, and/or output components such as a display device (which, for example, can be combined with a touch-sensitive panel), a sound speaker, and/or a haptic feedback system. More generally, user interface 108 can include hardware and/or software components that facilitate interaction between computing device 100 and the user of computing device 100.

B. Computing System

Figure 2:
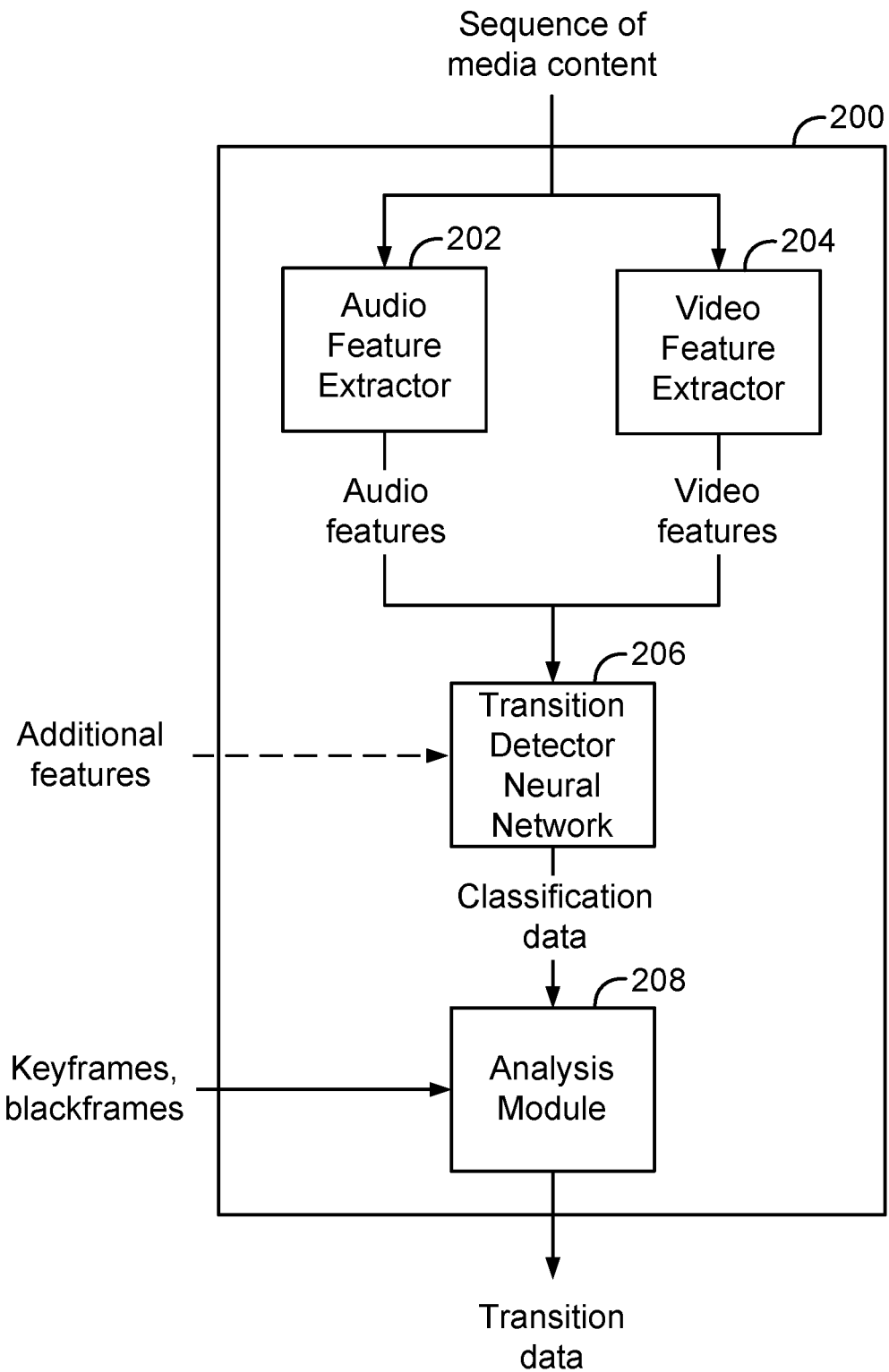
FIG. 2 is a simplified block diagram of an example computing system in which various described principles can be implemented.

FIG. 2 is a simplified block diagram of an example computing system 200. Computing system 200 can perform various acts and/or functions related to detecting keyframes within a video.

As shown in FIG. 2, computing system 200 can include various components, such as an audio feature extractor 202, a video feature extractor 204, a transition detector neural network 206, and an analysis module 208. Each of audio feature extractor 202, video feature extractor 204, transition detector neural network 206, and analysis module 208 can be implemented as a computing system. For instance, one or more of the components depicted in FIG. 2 can be implemented using hardware (e.g., a processor of a machine, a field-programmable gate array (FPGA), or an application-specific integrated circuit (ASIC), or a combination of hardware and software. Moreover, any two or more of the components depicted in FIG. 2 can be combined into a single component, and the function described herein for a single component can be subdivided among multiple components.

In line with the discussion above, computing system 200 can receive a sequence of media content, extract audio features and video features from portions of the sequence of media content, and analyze the audio features and video features for respective portions to determine whether or not any of the portions include transitions between different content segments. For instance, computing system 200 can process the audio features and video features for a portion using transition detector neural network 206 in order to determine whether or not the portion includes a transition between an advertisement segment and a program segment, a transition between different program segments, and/or a transition between different advertisement segments. Upon determining that the portion includes such a transition, computing system 200 can output transition data indicating that the portion of the sequence of media content includes a transition. Optionally, the transition data can specify a location of the transition within the portion.

The sequence of media content can include a video sequence, such as a linear sequence of content segments transmitted on one or more discrete channels (sometimes referred to as stations or feeds). As such, the linear sequence of media content can include a sequence of frames, or images, and corresponding audio data representing program segments and/or advertisement segments. Each frame can include pixel intensity values for respective pixels of a plurality of pixels. The pixel intensity values can be expressed in a color space, such as a red, green, blue (RGB) color space or grayscale.

As shown in FIG. 2, audio feature extractor 202 can be configured to extract audio features from portions of the sequence of media content. The audio features can include noise floor features, time domain features, or frequency range features, among other possible features. For instance, the audio features can include a sequence of spectrograms (e.g., mel-spectrograms and/or constant-Q transform spectrograms), chromagrams, and/or mel-frequency cepstrum coefficients (MFCCs). In some instances, audio feature extractor 202, or another component, can down-sample audio data for the sequence of media content before extracting the audio features. In some instances, these features can have a certain amount of overlap in audio samples to keep the audio aligned with the video.

Similarly, video feature extractor 204 can be configured to extract video features from portions of the sequence of media content. The video features can include a sequence of frames. Additionally or alternatively, the video features can include a sequence of features derived from frames or groups of frames, such as color palette features, color range features, contrast range features, luminance features, motion over time features, and/or text features (specifying an amount of text present in a frame). In some instances, video feature extractor 204, or another component, can down-sample and/or downscale frames of the sequence of media content before extracting the video features. For instance, video feature extractor 204 can down-sample the frames of a portion to four frames per second and downscale the frames (e.g., by a factor of two, four, five, etc.).

In one example implementation, audio feature extractor 202 and video feature extractor 204 can be configured to extract features from overlapping portions of the sequence of media content using a sliding window approach. For instance, a fixed-length window (e.g., a ten-second window, a twenty-second window, or a thirty-second window) can be slid over the sequence of media content to isolate fixed-length portions of the sequence of media content. For each isolated portion, audio feature extractor 202 can extract audio features from the portion and video feature extractor 204 can extract video feature from the portion. As a particular example, for a twenty-second portion, audio feature extractor 202 can extract four spectrograms per second and video feature extractor 204, for a total of forty frames of audio features, and video feature extractor 204 can similarly extract video features at a rate of four frames per second, for a total of forty frames of video features.

As also shown in FIG. 2, transition detector neural network 206 can be configured to receive audio features and video features for a portion of the sequence of media content as input, and process the audio features and video features to determine classification data. The classification data can include data indicative of whether or not the audio features and video features for the portion include a transition between different content segments. As one example, the classification data can include a binary indication or probability of whether the portion includes a transition between different content segments. In some instances, the classification data can include data about a location of a predicted transition within the portion. For example, transition detector neural network 206 can be configured to perform a many-to-many-sequence classification and output, for each frame of the audio features and video features, a binary indication or a probability indicative of whether or not the frame includes a transition between different content segments.

Further, in some examples, transition detector neural network 206 can be configured to predict a type of transition. For instance, the classification data can include data indicative of whether or not the audio features and video features for a portion include a transition from a program segment to an advertisement segment, an advertisement segment to a program segment, an advertisement segment to another advertisement segment, and/or a program segment to another program segment. As one example, for each of multiple types of transitions, the classification data can include a binary indication or probability of whether the portion includes the respective type of transition. In line with the discussion above, in an implementation in which transition detector neural network 206 is configured to perform a many-to-many sequence classification, for each frame, transition detector neural network 206 can output, for each of multiple types of transitions, a binary indication or probability indicative of whether or not the frame includes the respective type of transition.

The configuration and structure of transition detector neural network 206 can vary depending on the desired implementation. As one example, transition detector neural network 206 can include a recurrent neural network. For instance, transition detector neural network 206 can include a recurrent neural network having a sequence processing model, such as stacked bidirectional long short-term memory (LSTM). As another example, transition detector neural network 206 can include a seq2seq model having a transformer-based architecture (e.g., a Bidirectional Encoder Representations from Transformers (BERT)).

In some examples, transition detector neural network 206 can be configured to receive additional features extracted from a portion of the sequence of media content as input. For instance, transition detector neural network 206 can be configured to receive: closed captioning features representing spoken dialog or sound effects; channel or station identifiers features representing a channel on which the portion was transmitted; programming features representing a title, genre, day of week, or time of day; black frame features representing the locations of black frames; and/or keyframe features representing the locations of keyframes.

Video content can include a number of shots. A shot of video content includes consecutive frames which show a continuous progression of video and which are thus interrelated. In addition, video content can include solid color frames that are substantially black, referred to as black frames. A video editor can insert black frames between shots of a video, or even within shots of a video. Additionally or alternatively, black frames can be inserted between program segments and advertisement segments, between different program segments, or between different advertisement segments.

For many frames of video content, there is minimal change from one frame to another. However, for other frames of video content, referred to as keyframes, there is a significant visual change from one frame to another. As an example, for video content that includes a program segment followed by an advertisement segment, a first frame of the advertisement segment may be significantly different from a last frame of the program segment such that the first frame is a keyframe. As another example, a frame of an advertisement segment or a program segment following a black frame may be significantly different from the black frame such that the frame is a keyframe. As yet another example, a segment can include a first shot followed by a second shot. A first frame of the second shot may be significantly different from a last frame of the first shot such that the first frame of the second shot is a keyframe.

Transition detector neural network 206 can be trained using a training data set. The training data set can include a sequence of media content that is annotated with information specifying which frames of the sequence of media content include transitions between different content segments. Because of a data imbalance between classes of the transition detector neural network 206 (there may be far more frames that are considered non-transitions than transitions), the ground truth transitions frames can be expanded to be transition "neighborhoods". For instance, for every ground truth transition frame, the two frames on either side can also labeled as transitions within the training data set. In some cases, some of the ground truth data can be slightly noisy and not temporally exact. Advantageously, the use of transition neighborhoods can help smooth such temporal noise.

Training transition detector neural network 206 can involve learning neural network weights that cause transition detector neural network 206 to provide a desired output for a desired input (e.g., correctly classify audio features and video features as being indicative of a transition from a program segment to an advertisement segment).

In some examples, the training data set can only include sequences of media content distributed on a single channel. With this approach, transition detector neural network 206 can be a channel-specific transition detector neural network that is configured to detect transitions within media content distributed on a specific channel. Alternatively, the training data set can include sequences of media content distributed on multiple different channels. With this approach, transition detector neural network 206 can be configured to detect transitions within media content distributed on a variety of channels.

In some examples, the training data set can include a sequence of media content having an artificial transition. For instance, computing system 200 or an operator of computing system 200 can insert an advertisement segment into a given sequence of media content distributed to playback devices on a channel so as to generate a sample sequence of media content having an artificial transition between a program segment and an advertisement segment. The sample sequence of media content can then be added to the training data set.

Analysis module 208 can be configured to receive classification data output by transition detector neural network 206 for portions of the sequence of media content, and analyze the classification data to determine whether or not the classification data for respective portions are indicative of transitions between different content segments. For instance, the classification data for a given portion can include a probability, and analysis module 208 can determine whether the probability satisfies a threshold condition (e.g., is greater than a threshold). Upon determining that the probability satisfies a threshold, analysis module 208 can output transition data indicating that the given portion includes a transition between different content segments.

In some examples, analysis module 208 can output transition data that identifies a location of transition within a given portion. For instance, the classification data for a given portion can include, for each frame of the given portion, a probability indicative of whether the frame is a transition between different content segments. Analysis module 208 can determine that one of the probabilities satisfies a threshold condition, and output transition data that identifies the frame corresponding to the probability that satisfies the threshold condition as a location of a transition. As a particular example, the given portion may include forty frames, and the transition data may specify that the thirteenth frame is a transition.

In examples in which the classification data identifies two adjacent frames having probabilities that satisfy the threshold condition, analysis module 208 can select the frame having the greater probability of the two as the location of the transition.

As further shown in FIG. 2, analysis module 208 can be configured to use secondary data (e.g., keyframe data and/or black frame data) to increase the temporal accuracy of the transition data. As one example, analysis module 208 can be configured to obtain keyframe data identifying whether any frames of a given portion are keyframes, and use the keyframe data to refine the location of a predicted transition. For instance, analysis module 208 can determine that a given portion includes a keyframe that is within a threshold distance (e.g., one second, two seconds, etc.) of a frame that the classification data identifies as a transition. Based on determining that the keyframe is within a threshold distance of the identified frame, analysis module 208 can refine the location of the transition to be the keyframe.

As another example, analysis module 208 can be configured to use secondary data identifying whether any frames within the portion of the sequence of media content are keyframes or black frames as a check on any determinations made by analysis module 208. For instance, analysis module 208 can filter out any predicted transition locations for which there is not a keyframe or black frame within a threshold (e.g., two seconds, four seconds, etc.) of the predicted transition location. By way of example, after determining, using classification data output by transition detector neural network 206, that a frame of a given is a transition, analysis module 208 can check whether the secondary data identifies a keyframe or a black frame within a threshold distance of the frame. Further, analysis module 208 can then interpret a determination that there is not a keyframe or a black frame within a threshold distance of the frame to mean that that the frame is not a transition. Or analysis module 208 can interpret a determination that there is a keyframe or a black frame within a threshold distance of the frame to mean that the frame is indeed likely a transition.

In some instances, transition detector neural network 206 and analysis module 208 can be configured to operate at different levels of precision. For instance, transition detector neural network 206 can be configured to execute at two frames per second, and localize a predicted transition to the closest half second. Further, analysis module 208 can be configured to execute with greater precision (e.g., four frames per second, fifteen frames per second, thirty frames per second, etc.).

C. Transition Detector Neural Network

Figure 3:
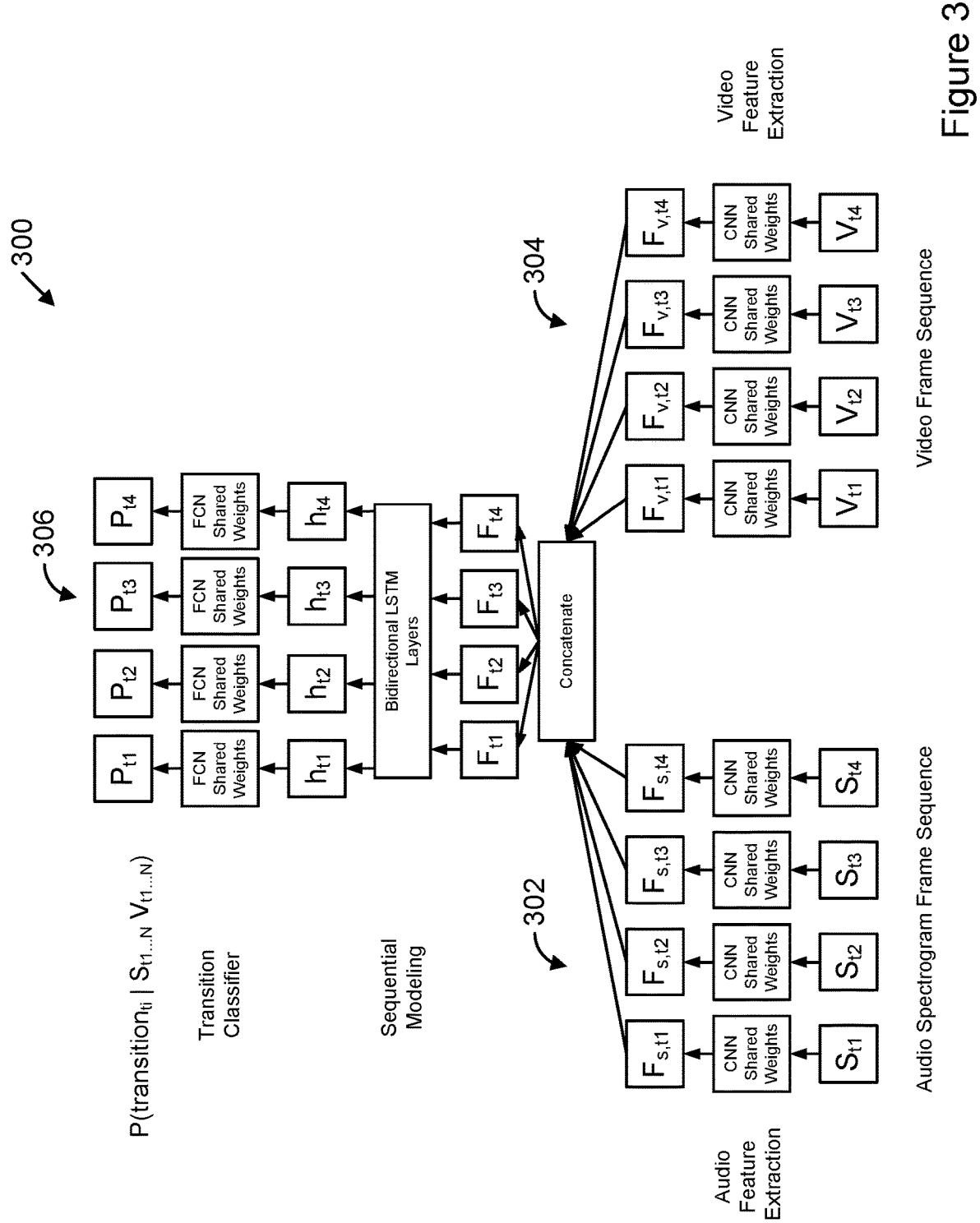
FIG. 3 is a conceptual illustration of an example transition detector neural network.

FIG. 3 is a conceptual illustration of an example transition detector neural network 300. As shown in FIG. 3, transition detector neural network 300 is a recurrent neural network having audio feature extraction layers 302, video feature extraction layers 304, and classification layers 306. Audio feature extraction layers 302 include one or more convolution layers and are configured to receive as input a sequence of audio features (e.g., audio spectrograms) and output computation results. The computation results are a function of weights of the convolution layers, which can be learned during training. Video feature extraction layers 304 similarly include one or more convolution layers and are configured to receive as input a sequence of video features (e.g., video frames) and to output computation results. Computation results from audio feature extraction layers 302 and computation results from video feature extraction layers 304 are then concatenated together, and provided to classification layers 306.

Classification layers 306 receives concatenated features for a sequence of frames, and outputs, for each frame, a probability indicative of whether the frame is transition between different content segments. Classification layers 306 include bidirectional LSTM layers and fully convolutional neural network (FCN) layers. The probabilities determined by classification layers 306 are a function of hidden weights of the FCN layers, which can be learned during training.

IV. Example Operations

Figure 4:
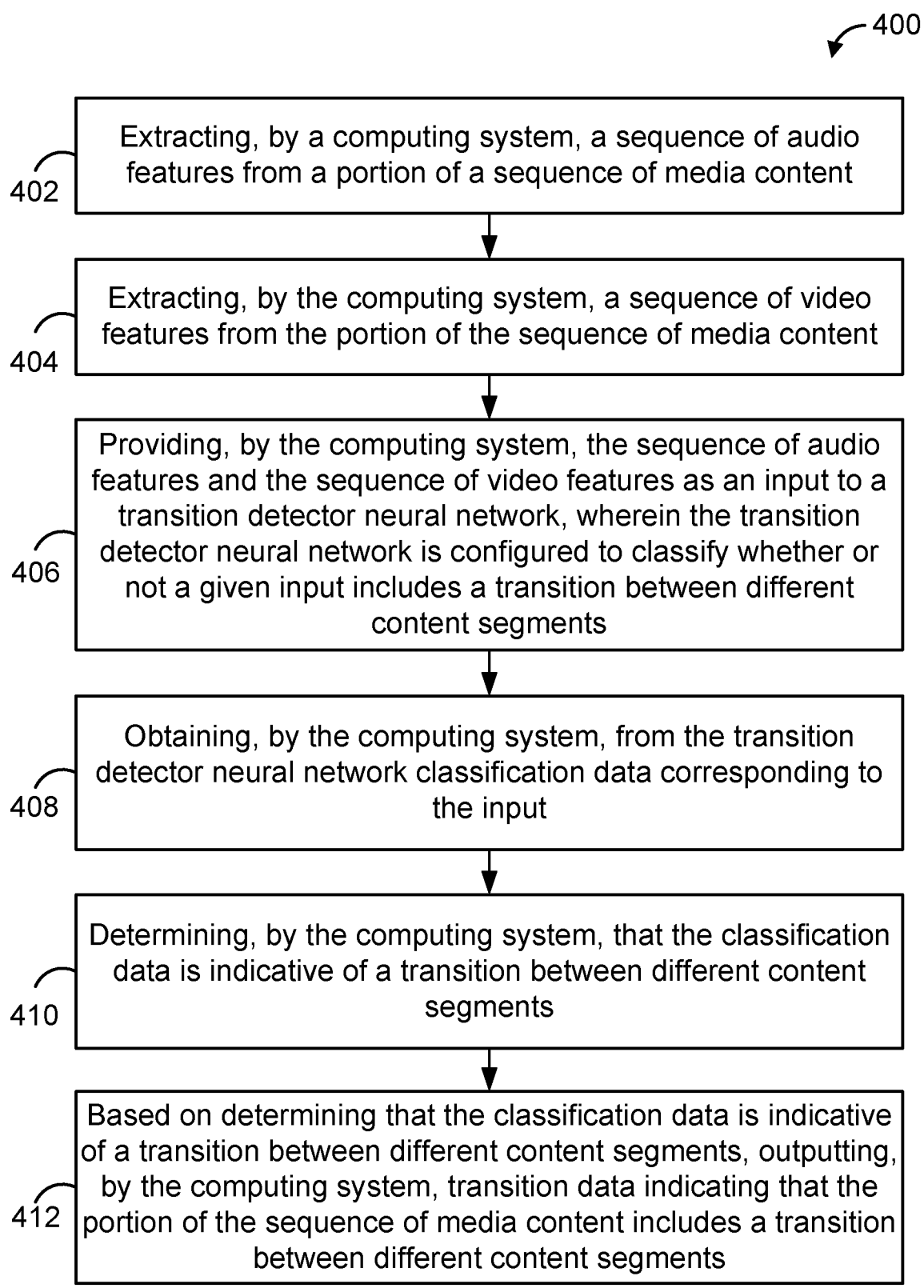
FIG. 4 is a flow chart of an example method.

FIG. 4 is a flow chart of an example method 400. Method 400 can be carried out by a computing system, such as computing system 200 of FIG. 2. At block 402, method 400 includes extracting, by a computing system, a sequence of audio feature from a portion of a sequence of media content. At block 404, method 400 includes extracting, by the computing system, a sequence of video features from the portion of the sequence of media content. At block 406, method 400 includes providing, by the computing system, the sequence of audio features and the sequence of video features as an input to a transition detector neural network. The transition detector neural network is configured to classify whether or not a given input includes a transition between different content segments. At block 408, method 400 includes obtaining, by the computing system, from the transition detector neural network classification data corresponding to the input. At block 410, method 400 includes determining, by the computing system, that the classification data is indicative of a transition between different content segments. And at block 412, method 400 includes outputting, by the computing system, transition data indicating that the portion of the sequence of media content includes a transition between different content segments.

IV. Example Variations

Although some of the acts and/or functions described in this disclosure have been described as being performed by a particular entity, the acts and/or functions can be performed by any entity, such as those entities described in this disclosure. Further, although the acts and/or functions have been recited in a particular order, the acts and/or functions need not be performed in the order recited. However, in some instances, it can be desired to perform the acts and/or functions in the order recited. Further, each of the acts and/or functions can be performed responsive to one or more of the other acts and/or functions. Also, not all of the acts and/or functions need to be performed to achieve one or more of the benefits provided by this disclosure, and therefore not all of the acts and/or functions are required.

Although certain variations have been discussed in connection with one or more examples of this disclosure, these variations can also be applied to all of the other examples of this disclosure as well.

Although select examples of this disclosure have been described, alterations and permutations of these examples will be apparent to those of ordinary skill in the art. Other changes, substitutions, and/or alterations are also possible without departing from the invention in its broader aspects as set forth in the following claims.

The invention claimed is:

1. A method comprising: extracting, by a computing system, a sequence of audio features from a portion of a sequence of media content;
    extracting, by the computing system, a sequence of video features from the portion of the sequence of media content; providing, by the computing system, the sequence of audio features and the sequence of video features as an input to a transition detector neural network, wherein the transition detector neural network is configured to classify whether or not a given input includes a transition between different content segments; obtaining, by the computing system, from the transition detector neural network classification data corresponding to the input;
    determining, by the computing system, that the classification data is indicative of a transition between different content segments; based on determining that the classification data is indicative of a transition between different content segments, outputting, by the computing system, transition data indicating that the portion of the sequence of media content includes a transition between different content segments, wherein the transition data identifies a probable location of the transition within the portion of the sequence of media content;
    obtaining secondary data identifying whether any frames within the portion of the sequence of media content are keyframes or black frames;

excluding any locations within the portion of the sequence of media content that are not within a threshold distance of either of a keyframe or a black frame from being considered a location of the transition within the portion of the sequence of media content; and including one or more locations within the portion of the sequence of media content that are within the threshold distance of either of a keyframe or a black as being considered the location of the transition within the portion of the sequence of media content.

2. The method of claim 1, wherein the transition detector neural network comprises a recurrent neural network.

3. The method of claim 2, wherein the recurrent neural network comprises audio feature extraction layers, video feature extraction layers, and classification layers.

4. The method of claim 3, wherein the classification layers comprise bidirectional long short-term memory layers and fully convolutional neural network layers.

5. The method of claim 1, further comprising:
refining the probable location of the transition within the portion of the sequence of media content to be a particular frame that is one of a keyframe or black frame identified in the secondary data.

6. The method of claim 1, further comprising:
using the secondary data to determine that the probable location is not a transition.

7. The method of claim 1, wherein the transition detector neural network is configured to determine, for each frame of the given input, a probability indicative of whether or not the frame includes a transition between different content segments.

8. The method of claim 7, wherein:
the classification data comprises probabilities for respective frames of the input, and
determining that the classification data is indicative of a transition between different content segments comprises determining that a probability of the probabilities satisfies a threshold condition.

9. The method of claim 1, wherein extracting the sequence of video features comprises extracting a sequence of video frames.

10. The method of claim 1, wherein extracting the sequence of audio features comprises extracting a sequence of spectrograms.

11. The method of claim 1, wherein the transition between different content segments comprises a transition between different program segments, different advertisement segments, or an advertisement segment and a program segment.

12. The method of claim 1, further comprising:
inserting an advertisement segment into a given sequence of media content distributed to playback devices on a channel so as to generate a sample sequence of media content having an artificial transition between a program segment and an advertisement segment;
adding the sample sequence of media content to a training data set; and
training the transition detector neural network using the training data set.

13. A non-transitory computer-readable medium having stored thereon program instructions that upon execution by a processor, cause performance of a set of acts comprising:
extracting a sequence of audio features from a portion of a sequence of media content;
extracting a sequence of video features from the portion of the sequence of media content;
providing the sequence of audio features and the sequence of video features as an input to a transition detector neural network, wherein the transition detector neural network is configured to classify whether or not a given input includes a transition between different content segments;
obtaining from the transition detector neural network classification data corresponding to the input;
determining that the classification data is indicative of a transition between different content segments;
based on determining that the classification data is indicative of a transition between different content segments, outputting transition data indicating that the portion of the sequence of media content includes a transition between different content segments, wherein the transition data identifies a probable location of the transition within the portion of the sequence of media content;
obtaining secondary data identifying whether any frames within the portion of the sequence of media content are keyframes or black frames;
excluding any locations within the portion of the sequence of media content that are not within a threshold distance of either of a keyframe or a black frame from being considered a location of the transition within the portion of the sequence of media content; and
including one or more locations within the portion of the sequence of media content that are within the threshold distance of either of a keyframe or a black as being considered the location of the transition within the portion of the sequence of media content.

14. The non-transitory computer-readable medium of claim 13, wherein the transition detector neural network is configured to determine, for each frame of the given input, a probability indicative of whether or not the frame includes a transition between different content segments.

15. A computing system configured for performing a set of acts comprising:
extracting a sequence of audio features from a portion of a sequence of media content;
extracting a sequence of video features from the portion of the sequence of media content;
providing the sequence of audio features and the sequence of video features as an input to a transition detector neural network, wherein the transition detector neural network is configured to classify whether or not a given input includes a transition between different content segments;
obtaining from the transition detector neural network classification data corresponding to the input;
determining that the classification data is indicative of a transition between different content segments;
based on determining that the classification data is indicative of a transition between different content segments, outputting transition data indicating that the portion of the sequence of media content includes a transition between different content segments, wherein the transition data identifies a probable location of the transition within the portion of the sequence of media content;
obtaining secondary data identifying whether any frames within the portion of the sequence of media content are keyframes or black frames;
excluding any locations within the portion of the sequence of media content that are not within a threshold distance of either of a keyframe or a black frame from being considered a location of the transition within the portion of the sequence of media content; and including one or more locations within the portion of the sequence of media content that are within the threshold distance of either of a keyframe or a black as being considered the location of the transition within the portion of the sequence of media content.

16. The computing system of claim 15, wherein the transition detector neural network is configured to determine, for each frame of the given input, a probability indicative of whether or not the frame includes a transition between different content segments.

17. The computing system of claim 15, wherein the transition between different content segments comprises a transition between different program segments, different advertisement segments, or an advertisement segment and a program segment.

\* \* \* \* \*